United States Patent [19]

Garczynski et al.

[11] Patent Number: 4,902,880

[45] Date of Patent: Feb. 20, 1990

[54] CARD READER SYSTEM AND METHOD WITH PRINTING AND VERIFICATION CAPABILITY

[75] Inventors: John S. Garczynski, Norristown; Jeffrey C. Hahn, Oreland; Edward C. Meehan, Villanova, all of Pa.

[73] Assignee: Peripheral Dynamics, Inc., Plymouth Meeting, Pa.

[21] Appl. No.: 252,180

[22] Filed: Sep. 30, 1988

[51] Int. Cl.$^4$ .............................................. G06F 15/20
[52] U.S. Cl. .................................... 235/375; 235/454; 235/494
[58] Field of Search ....................... 235/375, 454, 494

[56] References Cited

U.S. PATENT DOCUMENTS 4,088,265  5/1978  Garczynski ..................... 235/454

Primary Examiner—Harold I. Pitts
Attorney, Agent, or Firm—Woodcock Washburn Kurtz Mackiewicz & Norris

[57] ABSTRACT

A system and method is provided for entering data from a marked card into a central processing unit and for producing a receipt on which is displayed the entered data in alpha-numeric characters and a unique transaction code in machine readable form. The system utilizes a plurality of dispersed card reader-printers, each with data storage and processing capabilities, in communication with a local terminal on a sequential polling basis. The local terminal is, in turn, in communication with the central processing unit which stores the data read from the cards and assigns the transaction code to it. The system allows the data stored in the CPU to be verified against that read by the card reader-printer and allows the printed transaction code to be verified against that assigned by the central processing unit.

25 Claims, 3 Drawing Sheets

CARD READER SYSTEM AND METHOD WITH PRINTING AND VERIFICATION CAPABILITY

BACKGROUND OF THE INVENTION

1. Field of the Invention

The present invention relates to card readers, and more particularly, to a card reader system which incorporates the capability for reading, storing, transmitting, receiving, printing and verifying data.

2. Description of the Prior Art

Card reader units capable of reading data marked on paper cards and transmitting such data to a remote central processing unit, hereinafter CPU, have been in widespread use in the electronic data processing and communications area for some years. In many applications, such as lotteries, sports betting or casino player tracking, a plurality of dispersed one-at-a-time card readers are utilized, each having the capability of reading and transmitting data from marked cards to a CPU. However, in such applications, it would be desirable, in addition to reading the data, to provide the user entering the data with a record, such as a printed receipt, of the data stored by the CPU. It would also be desirable to verify that the data as stored by the CPU agrees with that read and/or printed by the card reader and notify the user should there be a discrepancy. While separate devices, also in communication with the CPU, can be used to provide a printed receipt for the user, they cannot detect (1) discrepancies between the data as read by the card reader and the data transmitted by the CPU for printing on the receipt, nor (2) discrepancies between the data transmitted by the CPU for printing on the receipt and the data actually printed in the user's receipt. These are serious drawbacks, especially in betting applications such as those mentioned above, wherein discrepancies of the first type deprive the user of the benefit of his chosen bet and discrepancies of the second type prevent the user from verifying the authenticity of his bet receipt.

SUMMARY OF THE INVENTION

It is a primary object of the current invention to provide a method and system for reading information marked on a card by the user, transmitting the information to a remote CPU, and providing the user with a printed receipt of the information.

It is another object of the invention to include in the printed receipt a unique transaction code assigned by the CPU for identification purposes and stored by the CPU along with the information read from the card. According to the invention the transaction code is printed on the card in machine readable form to allow verification that the correct transaction code was printed on the receipt prior to furnishing the receipt to th user.

It is still another object of the invention to allow the reading of cards and printing of receipts from a plurality of dispersed locations.

In accordance with the above objectives, there is provided a card reader-printer system capable of reading, storing, transmitting, receiving, printing and verifying data and in which a plurality of card reader-printer units are utilized, each of which is in communication with a local terminal which, in turn, is in communication with the CPU.

BRIEF DESCRIPTION OF THE DRAWINGS

FIG. 3A is a plan view of a card, with typically marked data, for use in lottery betting.

FIG. 3B is a plan view of the card of FIG. 3A after the printing of the receipt.

DESCRIPTION OF THE PREFERRED EMBODIMENT

Figure 1:
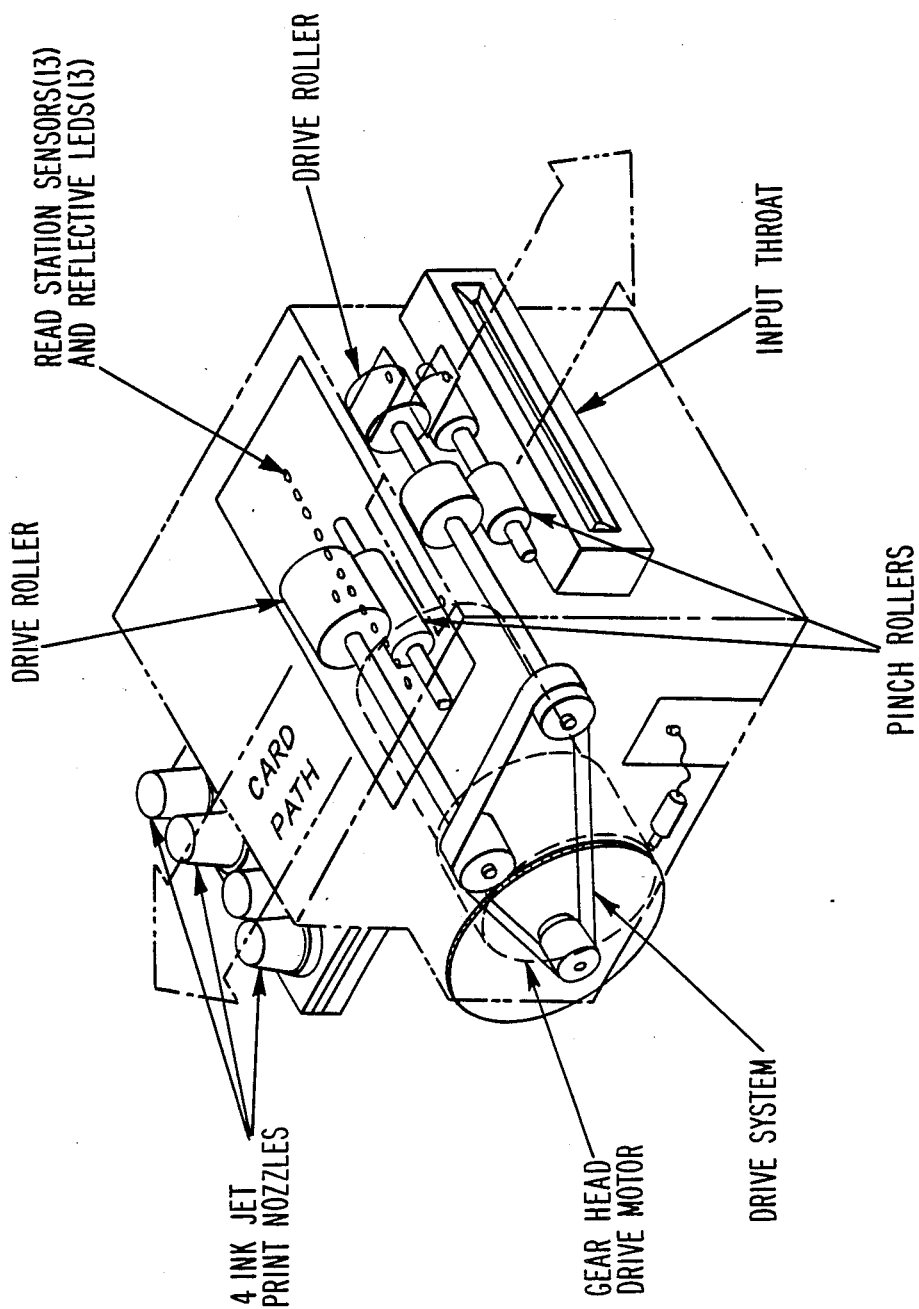
FIG. 1 is a perspective diagrammatic view of the card reader-printer unit in accordance with the present invention.

There is shown in FIG. 1 the card reader-printer, hereinafter CRP, of the invention. The major components of the device are the transport, reader and printer mechanisms and the data processing and control electronics, which includes a microprocessor (not shown). Data entry is begun by the user placing marks on a reflective card in predetermined locations, the locations of the marks indicating the data to be entered. A typical card, used for lottery betting, is shown in FIG. 3A. The card is divided into data entry and receipt portions. The data entry portion is pre-formatted for four wagers, each wager consisting of six numbers. The reader mechanism is capable of scanning 13 rows of data, a separate optical scanner being dedicated to each data row. In the card shown in FIG. 3A, row 1 is reserved for reading the clock marks associated with the printed transaction code, to be discussed below. A mark in row 2 notifies the CRP that the user, in this case the bettor, has opted to have the CRP select his wager numbers. Marks in rows 4–11 indicate the wager numbers. A mark in Row 12 notifies the CRP to void the wager should an error have been made. Row 13 contains the clock marks which notify the CRP when a mark is to be expected, thereby eliminating the possibility that stray marks located between columns will be inadvertently read.

After marking the card, the user enters it into the CRP via an input throat, shown in FIG. 1. Insertion of the card into the input throat interrupts a beam of light which informs the CRP's microprocessor that a card has been entered. Thereupon the microprocessor turns on the motor transporting the card via drive and pinch rollers toward the reader. The transport mechanism may be of the type described in U.S. Pat. No. 4,145,606, assigned to the assignee of the current invention and incorporated herein by reference. As shown in the card in FIG. 3A, an arrow directs the card to be entered with the receipt portion entering first. When the card has been transported a predetermined distance into the CRP, the leading edge of the card interrupts a second beam of light and informs the reader that data entry is to begin.

The reader mechanism may be of the conventional type and comprised of a series, in this case thirteen, light emitting devices, such as light emitting diodes, each paired with a sensor, such as a light sensitive semi-conductor. The light signal generated by each light emitter is directed to a predetermined portion of the card corresponding to a data row. The presence or absence of marks is determined by the intensity of reflected light detected by the sensors. The sensors convert these variations in light intensity into electrical form. The principles of optical data reading applicable to the reader of the invention are described in U.S. Pats. Nos. 4,088,265 and 3,896,294, assigned to the assignor of the current invention and incorporated herein by reference. After the entire card has been transported past the reader and all of the rows of data have been read, the aforementioned second beam of light becomes uncovered indicating the inbound cycle of the transport mechanism has been completed. At this time the motor is shut off, leaving the receipt portion of the card, which as previously mentioned was entered first, parked under the print nozzles.

Figure 2:
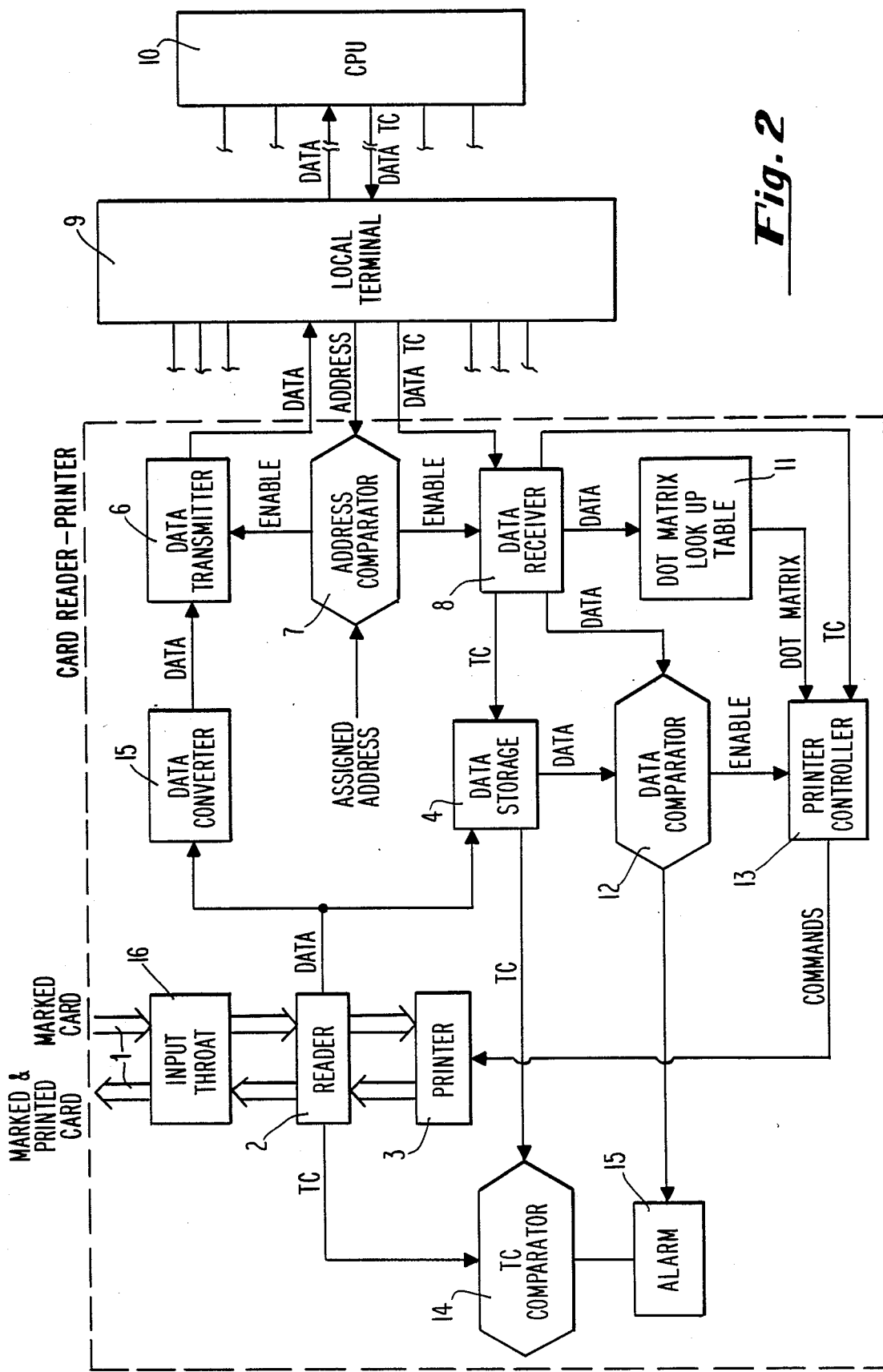
FIG. 2 is a block diagram illustrating the primary components of the card reader-printer/CPU system.

Referring now to FIG. 2, which shows the flow of the marked card and its data through the system's components, it can be seen that after the marked card has entered the input throat 16, it is carried by the transport mechanism 1 past the reader 2 and the sequentially read mark sense data from the card is entered into a data storage unit 4, such as an RAM memory, by the microprocessor. Since the electronic signals produced by the reader are not in a form suitable for transmission, they are inputted into a data converter 5. In the preferred embodiment the data is converted, using methods well known in the art, from Hollerith code to another code, which can be ASCII or binary image code, and the parallel lines of data (each parallel line representative of the data from one of the light signals) are converted to a serial bit stream and inputted into a data transmitter 6 for transmission to a local terminal 9.

In the CRP/CPU system a plurality of locally dispersed CRP units are utilized, each accepting cards on a random basis and communicating with a central processing unit 10 through a local terminal. In addition, depending on the size and character of the area in which the system is deployed, there may be a number of similar local terminals, each linking a plurality of CRP units with the CPU. For example, in a lottery betting system deployed in a supermarket, a CRP is placed at each cashier station and multiplexed to a traditional lottery terminal in the store. The lottery terminal communicates via telephone lines with a remote lottery central computer.

As indicated in FIG. 2, interface communication is controlled by assigning each CRP an address and having the local terminal sequentially poll each CRP. When a CRP which has read a card receives its address, the address comparator 7 enables the data transmitter 6 and the data, i.e. wagers in the case of a lottery system, are transmitted to the local terminal. The local terminal then encodes and transmits the data to the CPU where it is stored along with a unique transaction code assigned by the CPU. This transaction code can be used in the future to verify the authenticity of the data; in the case of a lottery, the transaction code allows authentication of the winning wager receipt.

After processing, the CPU retransmits the received data, together with the transaction code, denoted TC in FIG. 2, to the local terminal. When the CRP which originally read the data is again addressed by the local terminal, its data receiver 8 is enabled and the local terminal retransmits the data, together with the transaction code, to the CRP. The techniques for data conversion and transmission applicable to such CRP systems are disclosed in U.S. Pat. No. 4,065,662, assigned to the assignee of the current invention and incorporated herein by reference.

Figure 3B:
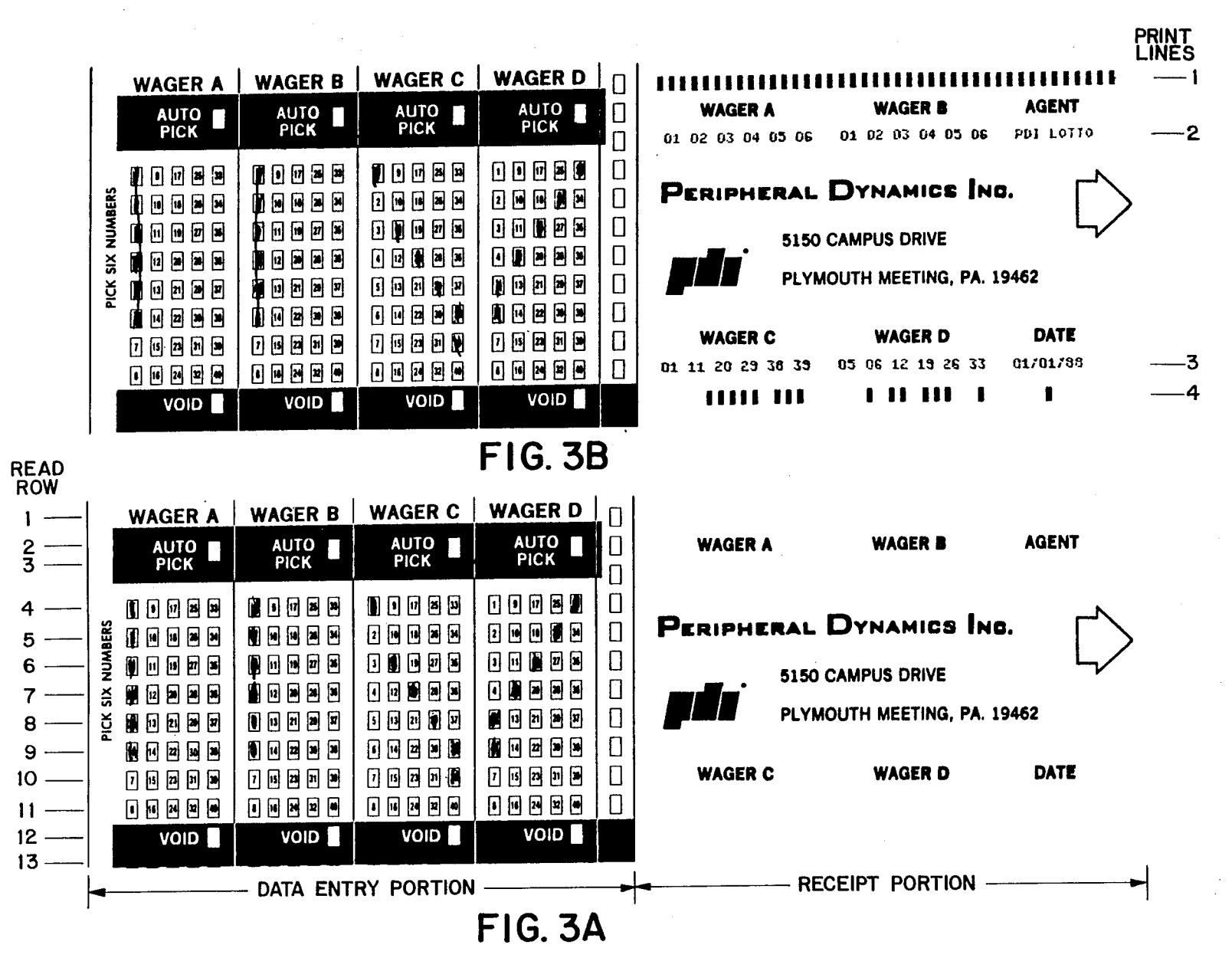

Still referring to FIG. 2, it can be seen that, after the retransmitted data is received by the CRP, it is inputted to a data comparator 12 along with the originally read data retrieved from storage 4. Discrepancies between the two data groups results in activation of an alarm 15, such as an audible tone and LED indicators, which notifies the user of the discrepancy, and the transaction is cancelled. If the data agrees, the transport mechanism 1 is reactivated with the motor drive in reverse so that the card begins an outbound cycle, and the printing controller 13 is enabled. In the preferred embodiment, the printer mechanism 3 is comprised of four ink jet nozzles, as shown in FIG. 1. As the receipt portion of the card passes under the nozzles on the outbound cycle the microprocessor compares the ASCII characters in the received data with the dot-matrix representation of those characters stored in a ROM memory look-up table 11 and pulses the ink jet dot trajectory drivers on a dot pair basis, thereby forming alpha-numeric characters on the receipt. This printed information documents for the user the data as stored in the CPU. In the case of lotteries, the alpha-numeric printed information states the wagers entered, as well as other information such as date and selling agent. FIG. 3B shows this printed information, on print lines 2 and 3, as formed on the receipt portion of the card shown in FIG. 3A.

As indicated in FIG. 2, the transaction code transmitted along with the retransmitted data is entered into the data storage unit 4 when received by the CRP. The transaction code is comprised of at least forty binary bits and is printed on the receipt portion of the card in mark sense machine-readable code along with clock marks. In the card shown in FIG. 3B, the clock marks are indicated on print line 1 and the transaction code on print line 4. On the outbound cycle, after the receipt portion of the card leaves the printer it is transported under the reader where the transaction code is read. As indicated in FIG. 2, the as-read transaction code is inputted into a comparator 14 along with the as received transaction code retrieved from storage. A discrepancy between the read and stored transaction codes, indicating an error in printing, activates the alarm 15 and cancels the transaction. This verification step insures that the receipt displays the correct transaction code for the data stored in the CPU.

After reading and verification, the transport mechanism continues the outbound cycle until the trailing edge of the card clears the reader, whereupon the microprocessor shuts off the motor, allowing the drive system inertia to carry the card to the edge of the first set of drive rollers, whereupon the user may withdraw the card. Subsequently, the card can be re entered into any of the CRP units within the system for verification of the transaction code, for example should the wager be a winning one in the lottery application.

We claim:

1. A method of reading, printing and verifying data in a card reader-printer/CPU information processing system comprising the steps of:
   (a) entering data and storing said data in a card reader-printer,
   (b) transmitting said data from said card reader-printer to a CPU, assigning a unique transaction code to said data, and storing said data in said CPU along with said transaction code,
   (c) transmitting said data and associated transaction code from said CPU to said card reader-printer, and receiving said data and transaction code and storing said transaction code in said card reader-printer,
   (d) comparing said data received by said card reader-printer from said CPU with said data stored in said card reader-printer in step (a), and activating an alarm and terminating further operations if said received data differs from said stored data, (e) producing a receipt on which said data and said transaction code received by said card reader-printer is displayed, and (f) reading said transaction code displayed on said receipt, comparing said read transaction code with said transaction code stored in step (c) and activating an alarm if said read transaction code differs from said stored transaction code.

2. The method according to claim 1 where in the step of entering said data into said card reader-printer comprises the steps of:

(a) supplying a card having a suitably reflective surface, said card having data entry and receipt portions, (b) placing marks on said card in predetermined locations corresponding to said data to be entered into said card reader-printer, (c) entering said marked card into said card reader-printer, and (d) transporting said card through said card reader-printer during an inbound cycle.

3. The method according to claim 2 wherein the step of reading said data comprises the steps of:

(a) generating a plurality of light signals, (b) directing each of said light signals along a predetermined portion of said card during said inbound cycle, (c) detecting the presence or absence of said marks in predetermined locations by sensing the intensity of light signals reflected back from said light signals directed onto said card, and (d) converting said reflected light signals into electrical signals carried along parallel lines, there being a separate parallel line for each of said reflected light signals, whereby said electrical signals are representative of said data marked on said card.

4. The method according to claim 3 further comprising the step of converting said data represented by said electrical signals along parallel lines to a serial bit stream prior to transmitting said data from said card reader-printer to said CPU.

5. The method according to claim 4 wherein the step of storing said information comprises the step of entering said data represented by said electrical signals along parallel lines into a first memory unit in said card reader-printer.

6. The method according to claim 5 further comprising the steps of:

(a) terminating said transport of said card through said card reader-printer after the presence or absence of said marks have been detected in all of said predetermined locations on said card, said termination of said transport representing the end of said inbound cycle, and (b) parking said card within said card reader at the end of said input cycle and maintaining said card in said parked condition while the operations in steps 1(b), (c) and (d) are carried out.

7. The method according to claim 1 further comprising the step of transporting said card out of said card reader-printer during an outbound cycle after the completion of step 1(d) and provided said comparison performed in step 1(d) does not indicate that said received data differs from said stored data.

8. The method according to claim 7 wherein the step of producing a receipt on which said data received is displayed comprises the step of printing said data, using alpha-numeric characters, in predetermined locations on said card during said outbound cycle.

9. The method according to claim 8 wherein the step of printing said data comprises the steps of:

(a) storing dot-matrix representations of alphanumeric characters in a second memory unit in said card reader-printer, (b) comparing characters in said data received by said card reader-printer from said CPU with said characters whose dot matrix representation is stored in said second memory unit, thereby obtaining said dot-matrix representation of each of said character in said data received, and (c) pulsing an ink-jet dot trajectory driver according to said dot-matrix representation of each of said characters to be printed, said pulsing being done during said outbound transport cycle, thereby printing on said card said characters in said data received.

10. The method according to claim 8 wherein the step of producing a receipt on which said transaction code is displayed comprises the step of printing or refraining from printing a mark in predetermined locations on said card during said outbound cycle.

11. The method according to claim 10 wherein the step of reading said transaction code displayed on said card comprises the steps of:

(a) generating a light signal, (b) directing said light signal along a predetermined portion of said card during said outbound cycle, (c) detecting the presence or absence of said marks in predetermined locations by sensing the strength of light signals reflected back from said light signal directed onto said card, and (d) converting said reflected light signals into electrical signals, said electrical signals representative of said transaction code.

12. The method according to claim 1 wherein the step of transmitting said data from said card reader-printer into which said data has been entered to said CPU comprises the steps of:

(a) assigning an address to said card reader-printer into which data has been entered and to a plurality of similar but dispersed card reader-printers, a different address being assigned to each of said card reader-printers, (b) transmitting address signals from a local terminal to each of said card reader-printers, (c) enabling each of said card reader-printers to transmit only if said card reader-printer has been addressed, (d) transmitting said data from said card reader-printer into which said data has been entered to said local terminal when said transmission from said card reader-printer has been enabled, and (e) transmitting said information from said local terminal to said CPU.

13. The method according to claim 12 wherein the step of transmitting address signals from said local terminal to each of said card reader-printer comprises the step of sequentially polling each of said card reader-printers.

14. The method according to claim 1 further comprising the step of verifying that said transaction code displayed on said receipt agrees with said transaction code stored in said CPU and that said data stored in said CPU along with said transaction code agrees with said data displayed on said card.

15. A card reader-printer system comprising:
    (a) a CPU,
    (b) a local terminal, said local terminal in communication with said CPU,
    (c) a plurality of card reader-printers in communication with said local terminal, each of said card reader-printers having:
        (i) reading means adapted to read data encoded on cards,
        (ii) printing means adapted to print data on said cards,
        (iii) address means for receiving address signals from said local terminal and for selectively enabling said card reader-printer operation depending on whether such card read-printer has been addressed,
        (iv) transmitting means for transmitting data read by said card reader-printer to said local terminal when said card reader-printer is addressed,
        (v) receiving means for receiving data transmitted by said local terminal when said card reader-printer is addressed,
        (vi) memory means for storing data read from said cards and data received from said local terminal,
        (vii) comparator means for comparing data read from said cards and data received from said local terminal with said data stored in said memory unit; and
        (viii) transporting means for transporting said cards through said card reader-printer.

16. The system according to claim 15 wherein said CPU comprises:
    (a) means for storing data received from said local terminal,
    (b) means for assigning a unique transaction code to each portion of data said CPU receives from said local terminal which represents data read by one of said card reader-printer from a single card, and
    (c) means for storing said transaction code along with said data to which it is assigned so as to enable verification that said transaction code was assigned to said data.

17. The system according to claim 16 wherein said cards contain a plurality of marks, the presence and absence of said marks in predetermined locations on said cards representing said data encoded therein.

18. The system according to claim 17 wherein said reading means comprises:
    (a) light generating and directing means for generating light beams and directing them toward predetermined locations on said cards,
    (b) light sensor means for receiving light signals reflected back from said light beams directed onto said cards, and
    (c) converter means for converting said light signals to electrical signals in a first form.

19. The system according to claim 18 wherein each of said card reader-printers further comprises means for converting said electrical signals in said first form to a second form, said second form being suitable for said transmitting to said local terminal.

20. The system according to claim 19 wherein each of said card reader-printer further comprises alarm means for generating an alarm signal when so directed by said comparator means.

21. The system according to claim 16 wherein said data which said printer is adapted to print on said cards comprises alpha-numeric characters and marks, said alpha-numeric characters representing a portion of said data received by said card reader-printer from said local terminal, said marks adapted to be readable by said reading means and representing said transaction code assigned to said data by said CPU.

22. The system according to claim 21 wherein said printing means comprises means for transferring ink dots to said cards so as to produce said alpha-numeric characters and said marks.

23. The system according to claim 15 wherein said local terminal transmits data transmitted from each of said card reader-printers to said CPU and transmits data transmitted from said CPU to each of said card reader-printers.

24. The system according to claim 15 wherein said transporting means comprises a motor operating in conjunction with rollers.

25. In a data processing system having a remote CPU in communication with a local terminal, a card reader-printer comprising:
    (a) an optical reader portion, said optical reader having means for converting data represented by marks on a card which passes through said optical reader to said data represented by electrical signals,
    (b) a printer portion, said printer having means for forming marks and alpha-numeric characters on said card, said marks representing data and being capable of conversion to electrical signals by said optical reader,
    (c) an input throat, said input throat having means for intering said card into said card reader-printer,
    (d) a transport mechanism, said transport mechanism having means for moving said card through said card reader-printer, said transport mechanism cooperating with said input throat and said optical reader and said printer so that said card, after being entered into said input throat, passes first through said optical reader, then through said printer and then through said optical reader again, whereby conversion of said data represented by said marks formed by said printer to electrical signals by said optical reader is enabled,
    (e) interface means for enabling said card reader-printer to transmit and receive data in communication with said local terminal on a sequential poling basis, and
    (f) a microprocessor, said microprocessor having means for comparing said data represented by said marks formed on said card by said printer and converted to said electrical signals by said optical reader with said data received from said local terminal.

* * * * *